United States Patent [19]
Bennett

[11] Patent Number: 5,603,064
[45] Date of Patent: Feb. 11, 1997

[54] CHANNEL MODULE FOR A FIBER OPTIC SWITCH WITH BIT SLICED MEMORY ARCHITECTURE FOR DATA FRAME STORAGE

[75] Inventor: Dwayne R. Bennett, Scarborough, Canada

[73] Assignee: Hewlett-Packard Company, Palo Alto, Calif.

[21] Appl. No.: 330,279

[22] Filed: Oct. 27, 1994

[51] Int. Cl.$^6$ .............................. G06F 13/00; H04J 14/08
[52] U.S. Cl. ..................... 395/872; 395/250; 359/139; 370/471
[58] Field of Search .................................. 395/872, 250; 359/139; 370/84, 82

[56] References Cited

U.S. PATENT DOCUMENTS

| | | | |
|---|---|---|---|
| 4,322,844 | 3/1982 | Fellinger et al. | 370/84 |
| 4,536,892 | 8/1985 | Lahti | 370/82 |
| 4,554,673 | 11/1985 | Stevens | 375/118 |
| 4,918,597 | 4/1990 | Krishnan et al. | 395/250 |
| 5,418,779 | 5/1995 | Yemini et al. | 370/54 |
| 5,450,548 | 9/1995 | Matsushima | 395/250 |
| 5,490,007 | 2/1996 | Bennett et al. | 359/139 |

OTHER PUBLICATIONS

Kumar Malavalli & Bent Stoevhase; "Distributed Computing With Fibre Channel Fabric"; Canstar (A Division of Alcatel Canada Wire, Inc.), 3900 Victoria Park Ave., North York, Ontario, Canada; Publication Date: Feb. 24, 1992.

Primary Examiner—Christopher B. Shin
Attorney, Agent, or Firm—Richard F. Schuette

[57] ABSTRACT

A channel module has an interchangeable port intelligence system at a front end which is connected to a memory interface system at a back end. Each port intelligence system provides one or more ports for connection to fiber optic channels and, the various port intelligence systems are distinguishable by a particular bit rate in which each supports. Data from the port intelligence system is bit sliced and forwarded to the memory interface system. In the system, the data is stored in receive memory in a distributed manner over a plurality of receive memory components. The bit slicing simplifies the input/output interface to the receive memory and enables storage of data with a common format, regardless of the rate at which the data was received from the channel. When data is read from the receive memory, each of the receive memory components contributes bits in order to reconstruct the data.

13 Claims, 10 Drawing Sheets

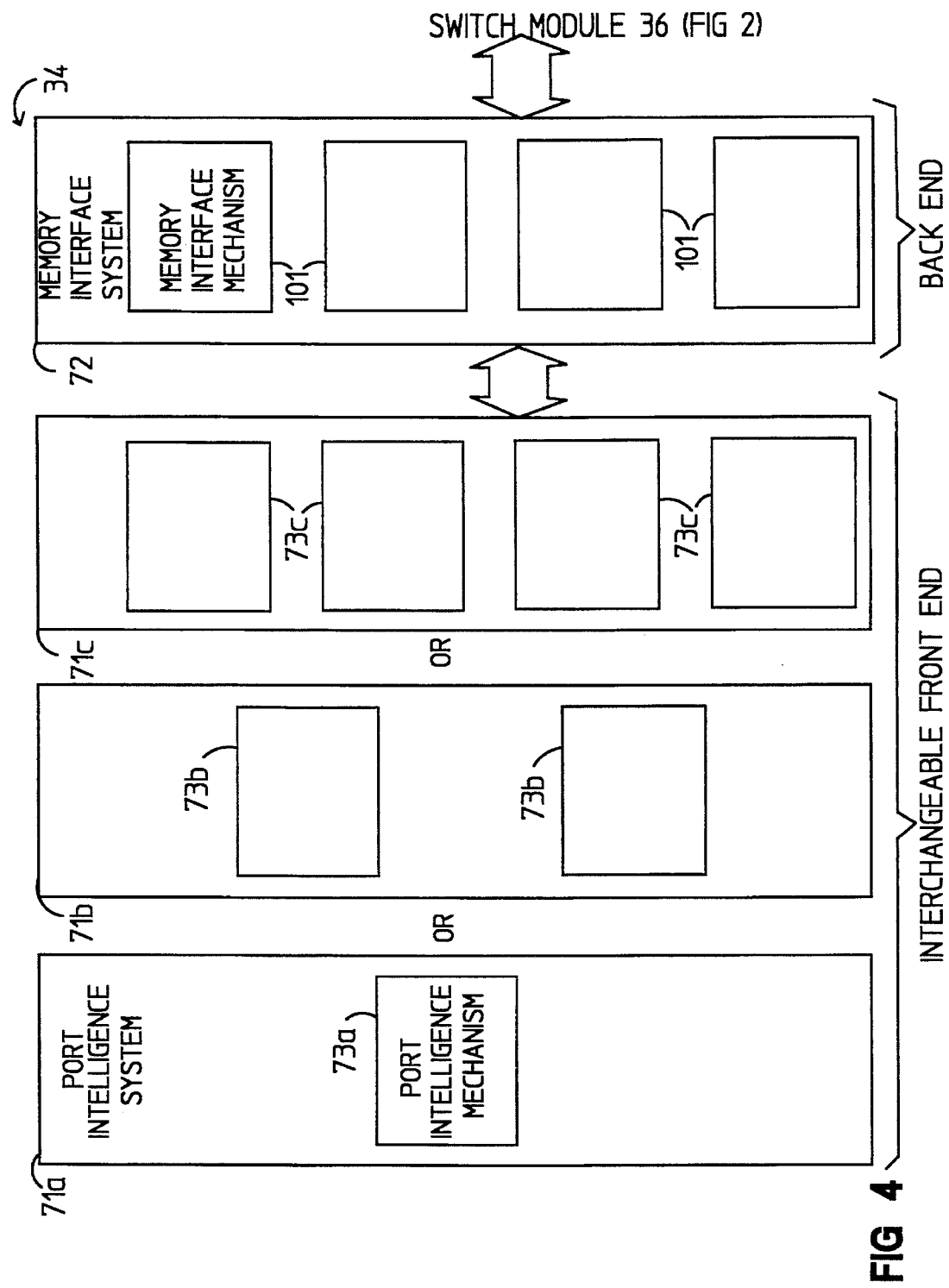

CHANNEL MODULE FOR A FIBER OPTIC SWITCH WITH BIT SLICED MEMORY ARCHITECTURE FOR DATA FRAME STORAGE

FIELD OF THE INVENTION

The present invention generally relates to data communications and fiber optics, and more particularly, to a system and method for providing memory for temporary frame storage in a fiber optic switch for interconnecting fiber optic channels, while simplifying the memory input/output interface, minimizing hardware requirements, and accommodating varying channel bit rates.

BACKGROUND OF THE INVENTION

A data communications network generally includes a group of interconnected communication channels which provides intercommunication among a combination of elements or devices, for instance, computers, peripherals, etc. Historically, networks have been constructed by utilizing communication channels formed from coaxial cables and/or twisted pair cable configurations and interconnected via a suitable interface, or network switch.

Fiber optic cables are increasingly being used in the network industry, instead of coaxial cables and twisted pairs, because of their much broader bandwidth, better propagation properties, and other optimal transmission characteristics. Recently, the Fibre Channel protocol was developed and adopted as the American National Standard For information Systems (ANSI). The Fibre Channel industry standard is described in detail in, for example, *Fibre Channel Physical And Siqnalling Interface*, Rev. 4.2, American National Standard For Information Systems (ANSI) (1993). The Fibre Channel industry standard provides for much higher performance and greater flexibility than previous industry standards by allowing for variable-length data frames to be communicated through fiber optic networks which comply with the standard.

A variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

The Fibre Channel industry standard also provides for several different types of data transfers. A class 1 transfer requires circuit switching, i.e., a reserved data path through the network switch, and generally involves the transfer of more than one data frame, oftentimes numerous data frames, between the network elements. In contrast, a class 2 transfer requires allocation of a path through the network switch for each transfer of a single frame from one network element to another.

To date, fiber optic switches for implementing networks in accordance with the Fibre Channel industry standard are in a state of infancy. One such fiber optic switch known in the industry is ANCOR, which is manufactured by and made commercially available from IBM, U.S.A. However, the performance of the ANCOR interface is less than optimal for many applications and can be improved significantly. Moreover, the rudimentary ANCOR interface is inflexible in that it provides for primarily circuit switching for class 1 transfers and is very limited with respect to frame switching for class 2 transfers.

Unlike circuit switching for class 1 transfers, frame switching for class 2 transfers is unfortunately much more difficult to implement. Frame switching requires a memory mechanism for temporarily storing an incoming frame prior to routing of the frame. Such a memory mechanism can add undesirable complexity and hardware to an interface and the need for numerous input/output (I/O) connections with associated support circuitry. This is especially true when channels carrying data at different bit rates are to be interfaced.

Thus, a heretofore unaddressed need exists in the industry for new and improved systems for implementing the Fibre Channel industry standard for fiber optic networks with much higher performance and flexibility than presently existing systems. Particularly, there is a significant need for a memory architecture which can accommodate frame storage with high performances while simplifying the memory input/output interface, minimizing hardware requirements, and accommodating varying channel bit rates.

SUMMARY OF THE INVENTION

An object of the present invention is to overcome the inadequacies and deficiencies of the prior art as noted above and as generally known in the industry.

Another object of the present invention is to provide a system and method for providing memory for implementing frame switching in a fiber optic switch for a fiber optic network.

Another object of the present invention is to provide memory for frame switching in a fiber optic switch, while simplifying the memory input/output interface.

Another object of the present invention is to provide memory for frame switching in a fiber optic switch, while minimizing hardware requirements.

Another object of the present invention is to provide a system and method for accommodating different bit rates associated with fiber optic channels for interconnection via a fiber optic switch.

Another object of the present invention is to provide a system and method for temporarily storing data frames which conform to the Fibre Channel industry standard.

Briefly described, the present invention is directed to a system and method for a fiber optic switch for providing circuit switching (directed to establishing a reserved path; also, class 1 transfer) and frame switching (class 2 data transfer). In order to accommodate frame switching, memory is utilized in the switch for temporary frame storage.

The system has one or more channel modules, each with one or more ports for connecting to fiber optic channels. Each channel module has a front end and a back end. The front end comprises one of several possible interchangeable port intelligence systems. Each of the port intelligence systems has one or more port intelligence mechanisms, each of which corresponds to a channel port. Each port intelligence mechanism has a transmitter and receiver directed to communicate data in accordance with the protocol, preferably Fibre Channel, associated with the fiber optic channel(s) to which it is connected. Each of the interchangeable front ends accommodates a different bit rate which can be associated with the channels. Moreover, data received by the receiver is referred to herein as "source data" and data to be transmitted by the transmitter is referred to herein as "destination data."

The back end is a memory interface system which has memory for temporarily storing data frames during a class 2 data transfer and which has bypass paths for bypassing the memory during a class 1 data transfer. During a class 2 source data transfer when data is to be stored, the source data is passed through an accumulator, which receives the incoming source data at a rate associated with the port and which stores the source data at a particular predetermined bit rate, which remains the same among the interchangeable port intelligence systems.

In order to simplify the memory input/output interface, minimize hardware, and permit a common storage format for accommodating different channel bit rates, a bit slicing architecture is employed within each channel module. For this purpose, the memory interface system at the back end of each channel module has a plurality of memory interface mechanisms. Each of the memory interface mechanisms receives an exclusive set of bits of the source data from each of the port intelligence mechanisms within the port intelligence system at the front end. Moreover, each of the memory interface mechanisms comprises its own receive memory component(s) for storage of its associated exclusive bit sets during a class 2 data transfer. Finally, when source data is transferred during a class 1 data transfer or when a source data frame is retrieved from memory storage during a class 2 data transfer, the various bit sets are concurrently output from each of the memory interface mechanisms and recombined to reconstruct the source data. In essence, the bit slicing architecture implements a distributed memory across various memory interface mechanisms within the memory interface system.

Data which is forwarded from the channel module is communicated along a plurality of data buses (main and intermix buses) to another channel module and ultimately to a destination port. The rate at which data is communicated along the data buses is manipulated to correspond to the bit rate of the destination port by using a particular number of the data buses to effectuate the data transfer.

Destination data passing from the data buses to a channel module is also bit sliced (thereby again decomposing the data) and forwarded in a distributed manner across the memory interface mechanisms associated with the memory interface system. Each memory interface mechanism has a destination data reconstruction mechanism for receiving its corresponding destination bit set from the data buses and for receiving the other destination bit sets directly from the other memory interface mechanisms. The destination data reconstruction mechanism recombines the destination bit sets to reconstruct the destination data.

Furthermore, the memory interface mechanisms each have a transmit bypass path for accommodating a class 1 data transfer. For a class 2 data transfer, each memory interface mechanism has a transmit memory for receiving and storing the destination data (not bit sliced) from the destination data reconstruction mechanism. The destination data is read from the transmit memory by the appropriate port intelligence mechanism and passed to the appropriate destination port.

In addition to achieving all the aforementioned objects, the present invention has numerous other advantages, a few examples of which are delineated hereafter.

An advantage of the present invention is that the port intelligence system as well as the memory interface system can be produced as discrete integrated circuit components with a reasonable number of input/output connections. As a result, they can be easily manufactured on a mass commercial scale.

Another advantage of the present invention is that the channel module has a modular construction in that it permits accommodation of various channel speeds by easy replacement of a front end having an appropriate port intelligence system, while maintaining the same common back end having a memory interface system.

Another advantage of the present invention is that the memory architecture is simple in design and is efficient as well as reliable in operation.

Other objects, features, and advantages of the present invention will become apparent to one with skill in the art upon examination of the following drawings and detailed description. It is intended that all such additional objects, features, and advantages be included herein.

BRIEF DESCRIPTION OF THE DRAWINGS

The present invention can be better understood with reference to the following drawings. The drawings are not necessarily to scale, emphasis instead being placed upon clearly illustrating principles of the present invention.

FIG. 4 is a schematic circuit diagram of the channel module of FIGS. 2 and 3, showing its modular design with interchangeable front ends and a common back end;

FIG. 5A is a schematic circuit diagram of a receive (rx) path portion for receiving source data from a source port, and FIG. 5B is a schematic circuit diagram of a transmit (tx) path portion for transmitting destination data to a destination port;

DETAILED DESCRIPTION OF THE PREFERRED EMBODIMENT

Figure 2:
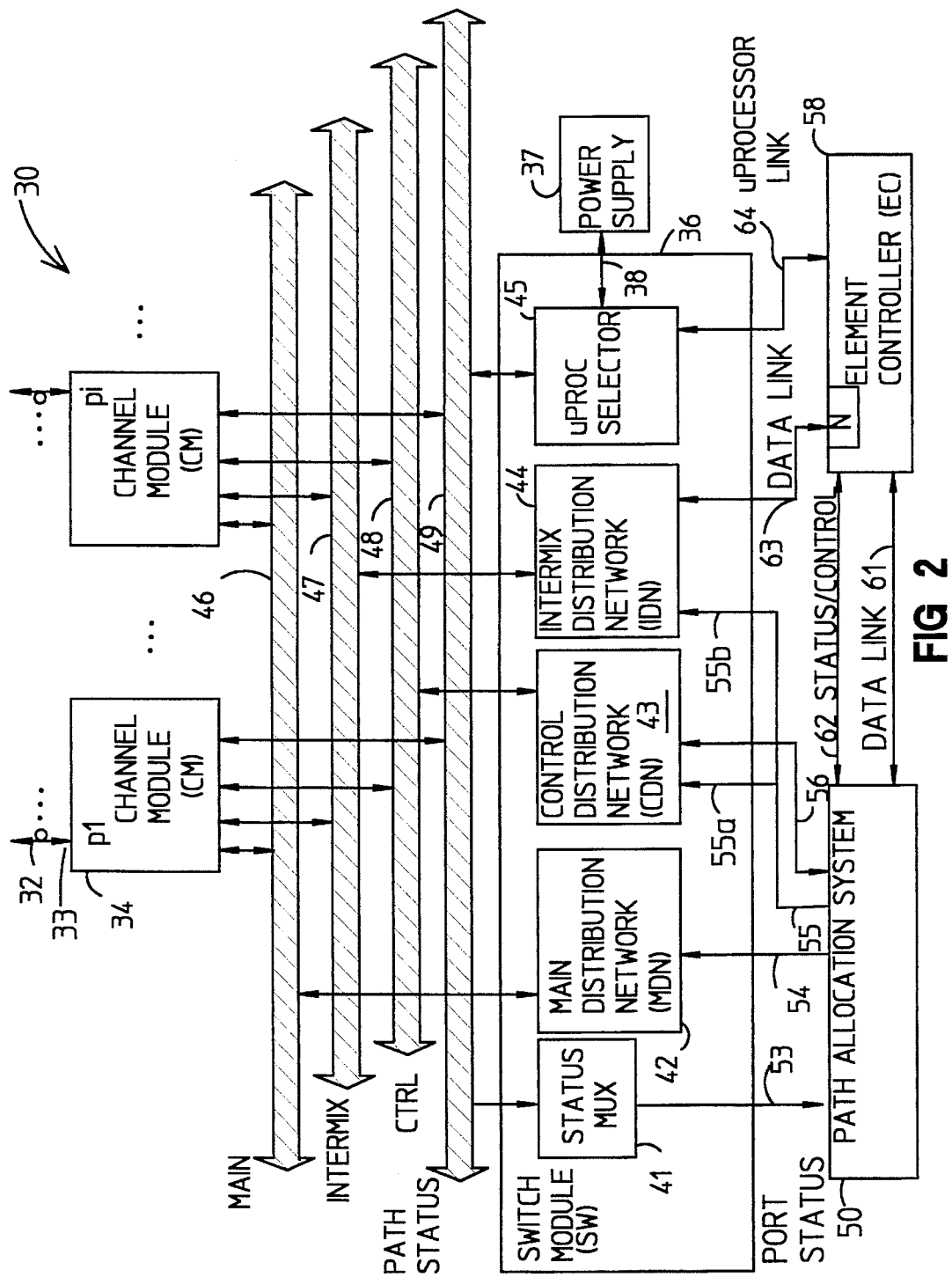
FIG. 2 is a schematic circuit diagram of a high performance fiber optic switch which utilizes the present invention.

With reference now to the drawings wherein like reference numerals designate corresponding parts throughout the several views, a schematic circuit diagram of a fiber optic switch 30 is shown in FIG. 2. The fiber optic switch 30 enables implementation of a fiber optic network by permitting selective interconnection of a plurality of fiber optic channels 32. The fiber optic switch 30 is a very flexible system, permits both circuit and frame switching for class 1 and 2 data transfers, respectively, in accordance with the Fibre Channel industry standard, and is a much higher performance system than other conventional fiber optic switches.

In architecture, the fiber optic switch 30 has a plurality of channel modules 34 to which the fiber optic channels 32 are connected via respective ports (p1–pi) 33. Each channel module 34 is connected to one or more of the fiber optic channels 32. Each channel module 34 provides port intelligence for data communication with the channels, as well as bypasses for class 1 data transfers and receive memory for temporarily storing data frames for class 2 data transfers, as will be further described in detail later in this document. The channel modules 34 are connected to a switch module 36, which receives and distributes electrical energy from a power supply 37. In the preferred embodiment, the switch module 36 is implemented as part of a back plane and has disposed thereon a number of functional interface elements.

The switch module 36 has a status multiplexer (MUX) 41 which is configured to receive status signals from the channel modules 34 concerning the ports 33 and associated circuitry. The status signals include at least the following: a "new frame arrived" signal, which indicates when a new frame has been received by a receive memory 84 (FIG. 3) associated with the channel module 34; a receiver ready, or "rxready" signal, which indicates when data received from a port 33 is ready and not ready to be sent through the switch 30 from the receive memory 84 (FIG. 3); an "intermix bus ready" signal, which indicates when the IDN 44 is ready (not being used) and not ready (currently being used) to transfer data; a "port active" signal, which indicates when a port intelligence mechanism 73 (FIG. 3) associated with a port 33 is active/inactive; a "transmitter ready" signal, which indicates when a transmit memory 86 (FIG. 3) associated with a port 33 is ready and not ready to receive data (destined for a destination port 33) from the switch 30; an "intermix ready" signal, which indicates when the IDN 44 is ready and not ready to perform an intermix transfer; and a "transfer status ready," or "xfer ready," signal, which indicates when status information is ready and not ready to be transferred to the path allocation system 50 from the associated status/control logic 85 (FIG. 3) of a channel module 34.

Referring again to FIG. 2, a main distribution network (MDN) 42 selectively interconnects the data paths of the channels 32. A control distribution network (CDN) 43 controls the MDN 42 and communicates control signals to the various channel modules 34. An intermix distribution network (IDN) 44 selectively interconnects intermix paths between channel modules 34. Intermix paths are a set of alternate data paths which are separate from those data paths associated with the MDN 42 and which can permit data flow between selected channels 32 while data paths of the MDN 42 are in use. Finally, a processor selector 45 can optionally be provided as part of an auxiliary system for interconnecting processors and controllers distributed throughout the fiber optic switch 30.

A path allocation system 50 is connected to the switch module 36 and, particularly, to the status MUX 41, the MDN 42, the CDN 43, and the IDN 44. The path allocation system 50 generally allocates data interconnect paths through the switch module 36 and between fiber optic ports 33 and determines the priority of the connections.

Also optionally connected to the switch module 36 is an element controller (EC) 58. The element controller 58 essentially provides servers, for example, a name server, a time server, etc. for the interface system 30. The element controller 58 has a data link 61 with the path allocation system 50 for communicating server information and a status/control connection 62 for exchanging status/control signals with the path allocation system 50. The element controller 58 also exchanges initialization and/or configuration information with the CMs 34 and the microprocessor selector 45 via connection 64.

Figure 3:
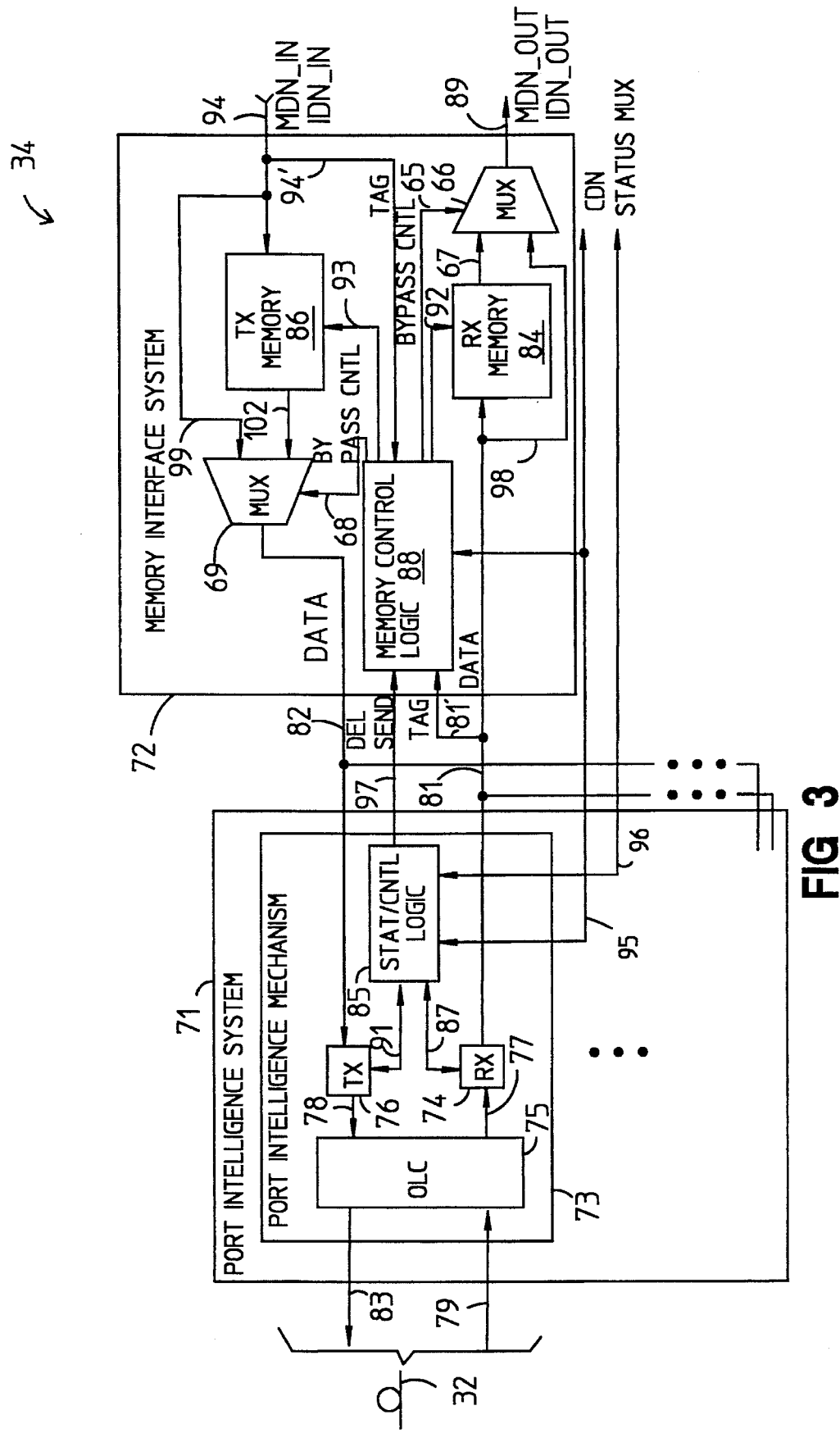
FIG. 3 is a schematic circuit diagram of a channel module (CM) of FIG. 2.

Preferably, each of the channel modules 34 is constructed as indicated in the schematic circuit diagram of FIG. 3. With reference to FIG. 3, each channel module 34 comprises a port intelligence system 71 connected to a memory interface system 72. In the preferred embodiment, the port intelligence system 71 has one or more port intelligence mechanisms 73. One port intelligence mechanism 73 is allocated to each fiber optic channel 32. Each port intelligence mechanism 73 has a receiver (RX) 74, transmitter (TX) 76, an optical link card (OLC) 75, and a status/control (STAT/CNTL) logic 85. The receiver 74 and the transmitter 76 are adapted to receive and transmit data, respectively, through their corresponding input and output fibers 79, 83 (shown collectively in FIG. 2 as channel 32) in accordance with the Fibre Channel industry standard protocol and at the channel's particular bit rate.

The OLC 75 is utilized to directly interface the port intelligence mechanism 73 to the fiber optic channel 32. The OLC 75 provides an optical-to-electrical conversion as well as a serial-to-parallel conversion between the input fiber 79 of the channel 32 and the receiver 74. Furthermore, the OLC 75 provides an electrical-to-optical conversion as well as a parallel-to-serial conversion between the output fiber 83 of the channel 32 and the transmitter 76. The OLC 75 can be any suitable conventional optical link card, for example but not limited to, a model OLC266 manufactured by and commercially available from IBM Corp., U.S.A., or a model MIM266 manufactured by and commercially available from ELDEC, Inc., U.S.A.

The status/control logic 85 monitors and controls both the receiver 74 and the transmitter 76, as indicated by corresponding bidirectional control connections 87, 91. Further, the status/control logic 85 exchanges control signals on control connection 95 with the CDN 43 (FIG. 2), provides status signals on connection 96 to the status MUX 41 (FIG. 2) indicative of, e.g., whether the corresponding port 33 is available or busy, and forwards control signals to the memory interface system 72 via connection 97. The status/control logic 85 further recognizes when a new frame is received by the receiver 74 and determines the transfer class (either 1 or 2) as well as the length of data pertaining to each new frame. It should be noted that a frame could have no data, as for example, in the case of an SOFc1 frame, which is initially passed through the switch 30 for setting the switch 30 up to reserve a bidirectional path for a class 1 data transfer.

The memory interface system 72 is connected in series, or cascaded, with the port intelligence system 71, and particularly, with each port intelligence mechanism 73 contained therein. The memory interface system 72 generally provides class 1 bypass data connections 98, 99 for class 1 data transfers and provides temporary storage for class 2 data transfers. For data storage relative to class 2 data transfers, the memory interface system 72 has a receive memory (RX MEMORY) 84 for source data, a transmit memory (TX MEMORY) 86 for destination data, and memory control logic 88 for controlling the receive and transmit memories 84, 86. The receive memory 84 and the transmit memory 86 may be partitioned into a number of individual buffers or memory blocks, if desired.

Figure 1:
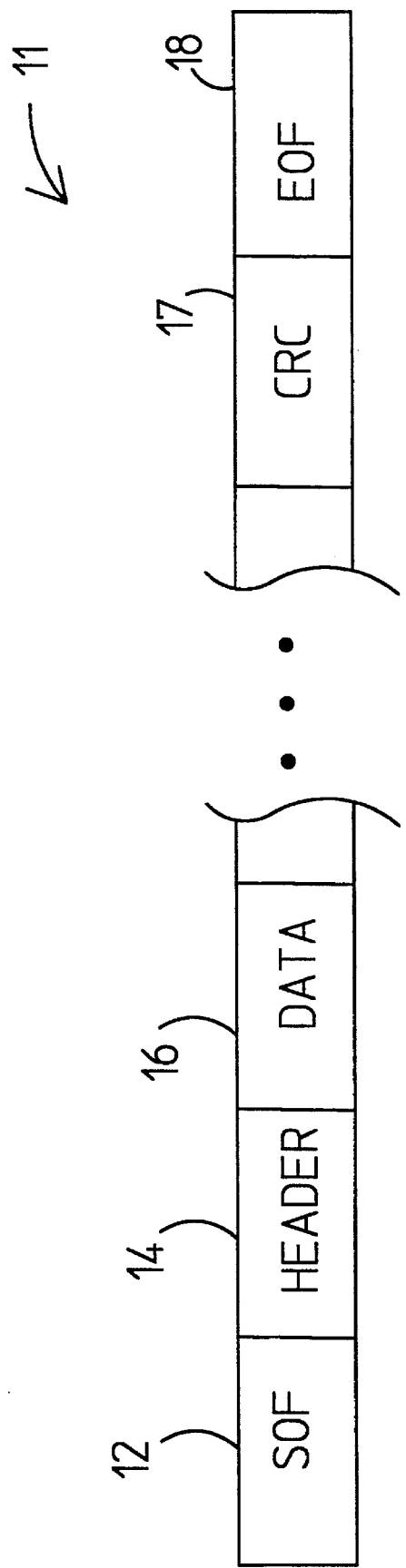
FIG. 1 is a schematic diagram of a variable-length frame communicated through a fiber optic network in accordance with the Fibre Channel industry standard.

When incoming class 1 source data is received by the memory interface system 72 from the port intelligence system 71, the source data bypasses the receive memory 84 via successively bypass data connection 98, MUX 66, and data connection 89. The data connection 89 introduces the source data to the data buses of the MDN 42 or the IDN 44 of the switch module 36. The memory control logic 88 receives a tag 81' from the receiver 74 indicative of either a class 1 or class 2 data transfer and controls the MUX 66 accordingly on class control connection 65. The receiver 74 generates the tag 81' based upon the header 14 (FIG. 1) on the incoming data. In the preferred embodiment, two-bit tags are used. A tag "00" indicates nonuse. A tag "01" indicates data. A tag "10" indicates either SOF or EOF for a class 1 data transfer. A tag "11" indicates either SOF or EOF for a class 2 data transfer.

When incoming class 2 source data is received by the memory interface system 72 (as well as an SOFc1 frame), as is determined by the memory control logic 88 via tag 81', the receive memory 84 reads and stores the source data from the receiver 74 via data connection 81 under the control of the memory control logic 88. Moreover, when the timing is appropriate, the receive memory 84 writes data to the data buses of the MDN 42 or the IDN 44 of the switch module 36 via data connection 67, MUX 66, and data connection 89 under the control of the control logic 88. In order to transfer data from the receive memory 84 to the data buses, the CDN 43 (FIG. 2) communicates a send control signal 95 to the status/control logic 85, and the status/control logic 85 in turn forwards a send signal via control connection 97 to the memory control logic 88. The send signal from the status/control logic 85 designates the length of the data frame to be sent. Based upon the send signal, the memory control logic 88 controls the receive memory 84 via control connection 92 and controls the MUX 66 with class control connection 65 so that the MUX 66 communicates data from the receive memory 84 to the data connection 89. If desired, the CDN 43 can also delete frames within the receive memory 84 by sending a delete signal (del) to the status/control logic 85, which in turn forwards the delete command to the memory control logic 88 via control connection 97.

Destination data intended for a destination port 33 from the data buses of the MDN 42 or the IDN 44 is made available to the transmit memory 86, as indicated by data connection 94, and the MUX 69, as indicated by the bypass data connection 99. A two-bit tag on tag connection 94', similar to the two-bit tag on tag connection 81', informs the memory control logic 88 when the destination data corresponds to either a class 1 data transfer or a class 2 data transfer. When class 1 destination data is received, the memory control logic 88 controls the MUX 69 via control connection 68 so that the MUX 69 channels the destination data directly to the transmitter 76 of the appropriate port intelligence mechanism 73 via data connection 82, thereby effectively bypassing the transmit memory 86. In contrast, when class 2 destination data is received by the memory interface system 72, the memory control logic 88 controls the transmit memory 86 to store the incoming destination data via data connection 94. When timing is appropriate, the destination data is then ultimately forwarded to the transmitter 76 of the appropriate port intelligence mechanism 73 via successively data connection 102, MUX 69, and data connection 82, under the control of the memory control logic 88.

A preferred embodiment of the channel module 34 of FIG. 3 is illustrated in FIG. 4. The channel module 34 of FIG. 4 is merely an example of a specific implementation of the present invention. The channel module 34 employs a bit slicing architecture, as will be further clarified later in this document, which ultimately permits a significant simplification in the input/output interface to memory, a minimization of hardware, rate matching capabilities for accommodating fiber optic channels 32 having different bit rates, and in general a desirable modular construction which is best illustrated in FIG. 4.

In regard to the modular construction, each channel module 34 comprises one of three possible interchangeable port intelligent systems 71a, 71b, 71c at the front end, which is connected to, or cascaded with, the memory interface system 72 at the back end. The port intelligence system 71a has a single port intelligence mechanism 73 for servicing a fiber optic channel 32 which carries data at a first bit rated for example, 1062 megabit/second (Mbit/s; also, Mbaud). The port intelligence system 71b has two port intelligence mechanisms 73b for servicing two respective fiber optic channels 32 which carry data at a second rate, for example, 531 Mbit/s. Furthermore, the port intelligence system 71c has four port intelligence mechanisms 73c for servicing four respective fiber optic channels 32 which carry data at a third rate, for example, 266 Mbit/s.

Figure 5A:
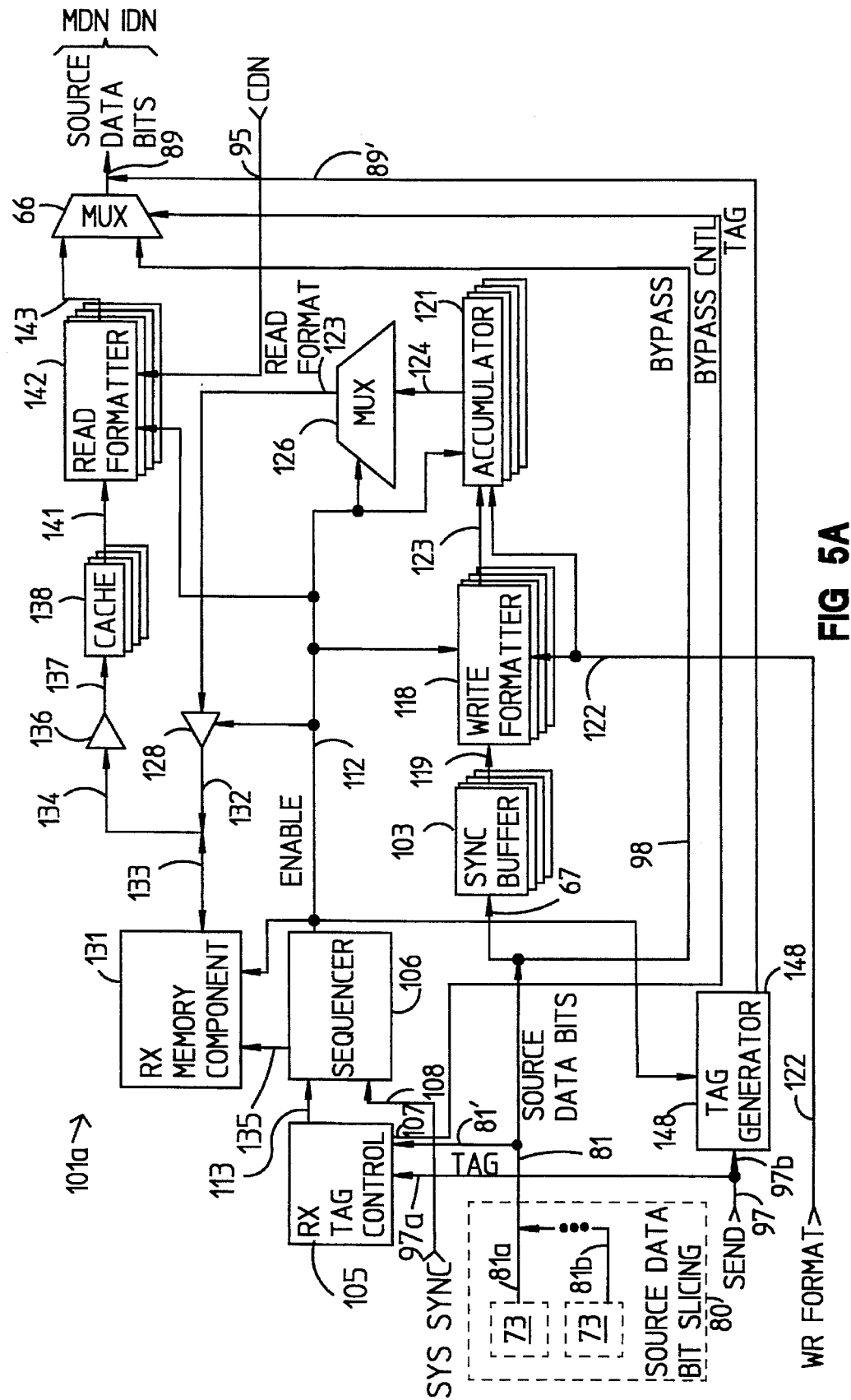
FIG. 5A and 5B show a schematic circuit diagram of a memory interface mechanism of FIG. 4; specifically.
Figure 5B:
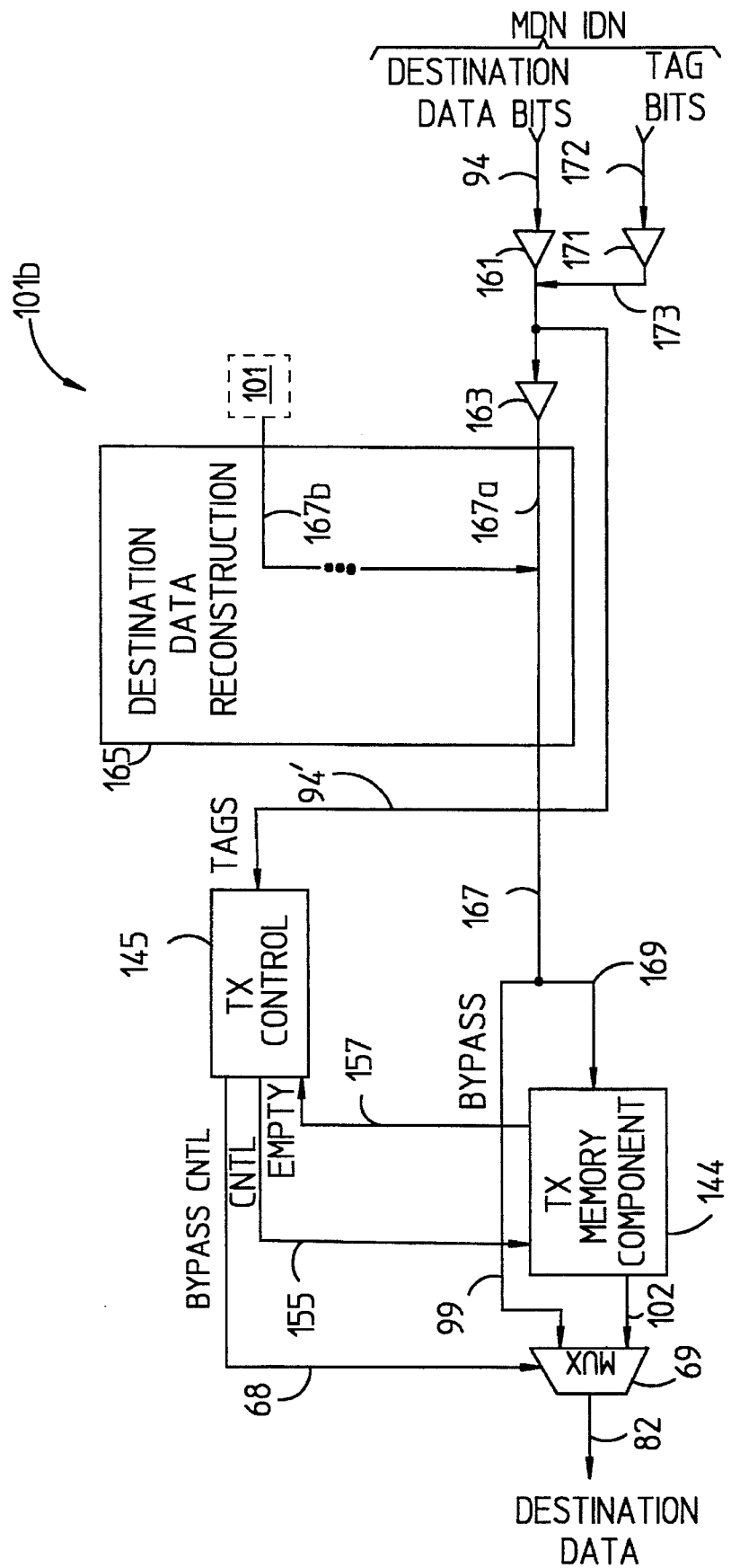

Each of the memory interface mechanisms 101 of FIG. 4 is constructed in the preferred embodiment as shown in the schematic circuit diagrams of FIGS. 5A and 5B, which illustrate the bit slicing architecture of the present invention. FIG. 5A is a schematic circuit diagram of a receive (rx) path portion 101a for receiving source data from a source port 33, and FIG. 5B is a schematic circuit diagram of a transmit (tx) path portion 101b for transmitting destination data to a destination port 33. Moreover, each memory interface mechanism 101 implements memory reading and writing operations pursuant to the timing diagram shown in FIG. 6. However, it should be noted that the preferred embodiment constructed as shown in FIGS. 5A, 5B, and 6 is merely an optional configuration for implementing the bit slicing architecture of the present invention.

In accordance with the bit slicing architecture as indicated in FIG. 5A by source data bit slicing interface 80, each memory interface mechanism 101, receives an exclusive portion, i.e., certain bits, of the incoming source data from each port 33 associated with the channel module 34. In the preferred embodiment, each memory interface mechanism 101 receives a exclusive set of two source data bits, for instance, bit set 7, 6 or bit set 5, 4 or bit set 3, 2 or bit set 1, 0, from each of the channel module ports 33, while the remaining three source data bit sets are channelled to respective other memory interface mechanisms 101 which are in parallel. In FIG. 5A, the system 101 is shown receiving, for example, bit sets 81a through 81b. In the preferred embodiment, each system 101 receives 1, 2 or 4 bit sets, depending upon the particular port intelligence system 71 which is utilized.

When there is a class 1 source data transfer through the memory interface system 72 (after a reserved path has already been established through the switch module 36), each memory interface mechanism 101 passes its corresponding source data bit sets through the system 72 without storage. With reference to FIG. 5A, the source data bit sets (7, 6 or 5, 4 or 3, 2 or 1, 0) from each of the port intelligence mechanisms (73a, 73b, or 73c) are communicated to the data buses (main3, main2, main1, main0) of the MDN 42 along bypass connection 99. In contrast, when there is a class 2 source data transfer through the memory interface system 72, each memory interface mechanism 101 temporarily stores its corresponding source data bit sets until a path is allocated for the transfer through the switch module 36.

Figure 6:
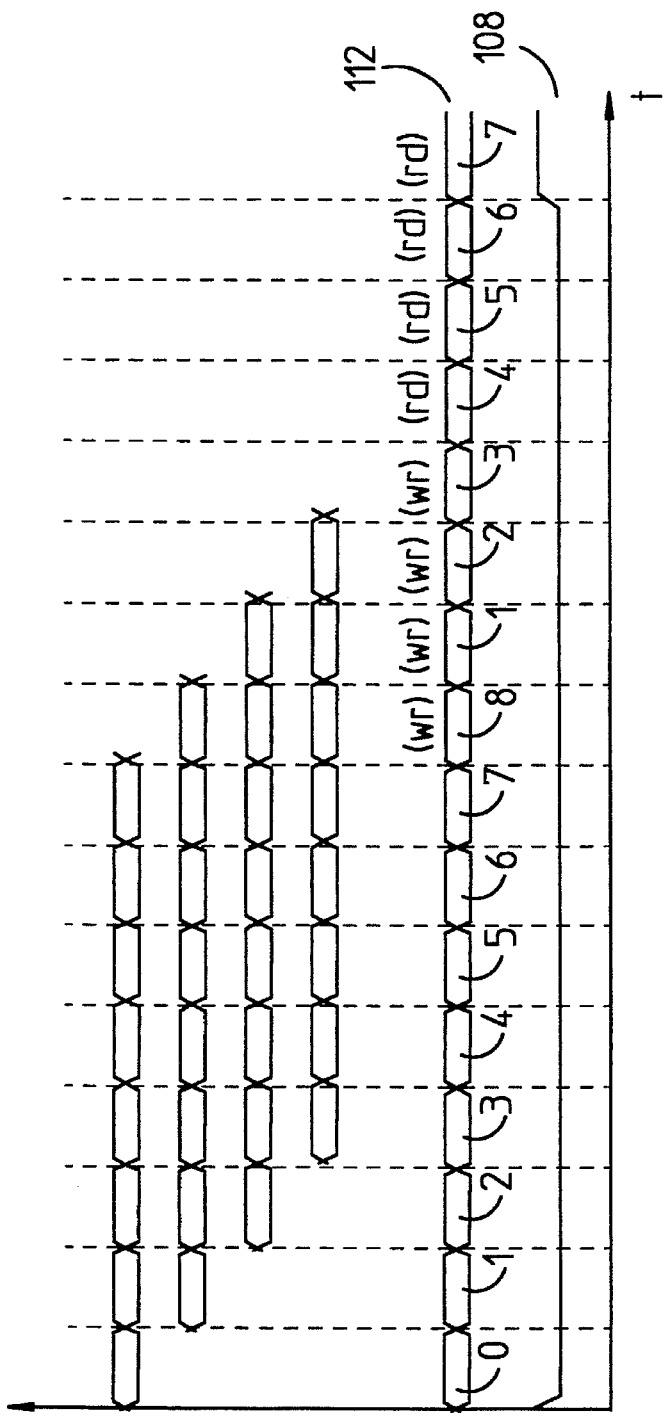
FIG. 6 is a graph illustrating the timing for read and write operations through the memory interface system of FIG. 4.

As shown in FIG. 6, during the four successive cycles c0–c3 (delineated as "wr"), source data bits from respective ports (p0–p3) 33 are written to receive memory 84 (FIG. 3). Further, during the next four successive cycles c4–c7, source data bits from respective ports (p0–p3) 33 are read from the receive memory 84 (FIG. 3) and communicated to the data buses of either the MDN 42 or the IDN 44 of the switch module 36. Thus, as is apparent from FIG. 6, eight data transfers from each port intelligence mechanism 73 to the memory interface system 72 must complete before source data can be fully written into receive memory 84. It should be further noted that the skewing of data transfers for each port 33 obviates the need for extra buffering stages in the memory interface mechanisms 101.

With reference to FIG. 5A, the specific architecture of the receive memory interface mechanism 101a will now be described in detail. A sequencer 106 provides control for the various components of the receive path portion 101a and can be implemented with any suitable logic, state machine, or processor. The sequencer 106 receives a system sync signal 108, for instance, a system clock at 26.6 MHz, and in turn generates enable signals 112 with an internal counter (not shown). In the preferred embodiment, an enable signal 112 is asserted once per sixteen assertions of the system clock, as is shown in the timing diagram of FIG. 6. It should further be noted that all of the memory interface mechanisms 101 receive the same system sync signal 108, and it is used generally to clock all elements situated therein.

A source data bit set (7, 6 or 5, 4 or 3, 2 or 1, 0) from each of the port intelligence mechanisms (73a, 73b, or 73c) is communicated to a set of synchronization (sync) buffers 103, preferably four in number, along data connections 81, 67 and also is communicated to the MUX 66 via data connection 81 and bypass data connection 98. A receive tag control 105 receives and monitors the two-bit tag 81' from the respective port intelligence mechanism to determine the time when source data is transferred and the transfer class associated therewith. When the receive tag control 105 determines that a class 1 source data transfer is to occur, the receive tag control 105 controls the MUX 66 via bypass control connection 107 so that the MUX 66 communicates the incoming source data to the data connection 89, which is connected to the MDN 42 or IDN 44. Thus, the incoming class 1 source data bypasses memory storage. Alternatively, when the receive tag control 105 determines that a class 2 source data transfer is to occur, the class 2 source data is passed into the receive memory component 131. The send signal 97 causes the receive tag control 105 to issue memory write signals 113 to the sequencer 106, which in turn causes the receive memory component 131 to receive and store the source data via control connection 135. The send signal 97 also triggers the receive tag control 105 to actuate bypass control 107 so that the MUX 66 connects the data connection 143 to the data connection 89 and the incoming source data is dealt with in the synchronization (sync) buffers 103, as is further described hereinafter.

In the preferred embodiment, each of the sync buffers 103 is a commercially available circular buffer, which is well known in the art. Essentially, incoming source data bits are received by the sync buffers 103 at one of the three rates, i.e., 266 Mbit/s, 531 Mbit/s (2 parallel paths at 266 Mbit/s), or 1062 Mbit/s (4 parallel paths at 266 Mbit/s), and after bits are read from the sync buffers 103, the space from where it was read is liberated for entry of new bits.

More specifically, in the case of a 1062 Mbit/s, the four sync buffers 103 are ganged together as single set and each of the four sync buffers 103 receives a bit set (7, 6 or 5, 4 or 3, 2 or 1, 0) from the single port intelligence mechanism 73a (FIG. 4) during a clock cycle (preferably 26.6 MHz). Thus, 8 source data bits are received at a time for four successive memory read cycles (FIG. 6).

In the case of a 531 Mbit/s, the sync buffers 103 are ganged together into two sets and each of the two sets receives two source bit sets (7, 6 or 5, 4 or 3, 2 or 1, 0) from each of the two port intelligence mechanisms 73b (FIG. 4) during a clock cycle (26.6 MHz). Thus, 4 source data bits are received at a time for the four successive memory read cycles (FIG. 6).

In the case of a 266 Mbit/s, one of the four sync buffers 103 receives a bit set (7, 6 or 5, 4 or 3, 2 or 1, 0) from one of the four port intelligence mechanisms 73c (FIG. 4) during each clock cycle (26.6 MHz). Thus, 2 source data bits are received at a time for the four successive memory read cycles (FIG. 6).

In accordance with the enable signal 112 from the sequencer 106, write formatters 118 read data from respective sync buffers 103 and communicate the data to respective accumulators 121. The write formatters 118 receive a write format signal 122 which informs the write formatters 118 as to which particular port intelligence system 71a, 71b, 71c is connected to the memory interface system 72. Recall that the systems 71a, 71b, 71c are distinguishable by port rated i.e., 1062, 531, 266 mbit/s, respectively. Generally, the write format signal 122 determines how many parallel pipelines are configured in the memory interface mechanism 101. The write format signal 122 can be generated via any suitable technique and apparatus. In the preferred embodiment, the particular port intelligence system 71a, 71b, 71c is determined via employment of straps associated with the systems 71a, 71b, 71c which implement a two-bit code indicative of the particular system 71a, 71b, 71c. Obviously, there are numerous other options.

Based upon the write format signal 122 and conditioned upon the sequencer enable signal 112, the write formatters 118 provide 2, 4, or 8 bits at a time to the accumulators 121 during each clock cycle (26.6 MHz). In the case where a port intelligence system 71a (single 1062 Mbit/s port) is utilized, the write formatters 118 forward 8 bits per clock cycle, or 2 bits from each sync buffer 103. In the case when a port intelligence system 71b (two 531 Mbit/s ports) is utilized, the write formatters 118 forward 4 bits per clock cycle, or 2 bits from two sync buffers 103. Finally, in the case when a port intelligence system 71c (four 266 Mbit/s ports) is utilized, the write formatters 118 forward 2 bits per clock cycle, or 2 bits from one sync buffer 103.

Four accumulators 121 are employed and connected to the write formatters 118, respectively. The accumulators 121 are generally register mechanisms, each preferably 16 bits wide, for receiving data bits from respective write formatters 118 and for accumulating the data bits over time. The accumulators 121 are controlled by the enable signal 112 from the sequencer 106 and receive the write format signal 122.

A MUX 126 is preferably 16 bits wide and is controlled by the enable signal 112 from the sequencer 106. One of the accumulators 121 passes its 16 bits to the MUX 126 during each clock cycle (26.6 MHz). The MUX 126 essentially chooses which accumulator 121 to read from during each clock cycle and forwards the 16 bits to a tristate output driver 128.

The tristate output driver 128, which is also controlled by the enable signal 112 from the sequencer 106, directs data it receives from the MUX 126 to a receive memory component 131, which has a storage capacity of 16K×16, as indicated by the data connections 132, 133. The receive memory component 131 is implemented in a 16K×16 synchronous static random access memory (SRAM), which is controlled by the sequencer 106 via enable signal 112. The sequencer 106 also provides other control signals to the receive memory component 131, including for example, address, strobe, read, and write, as indicated by control connection 135. As mentioned, the sequencer 106 receives memory write signals 113 from the receive tag control 105 in order to control data entry into the receive memory component 131.

An input buffer 136 passes data, preferably at 16 bits per memory read cycle (26.6 MHz; FIG. 6), from the receive memory component 131, as indicated by lines 133, 134 to temporary storage caches 138, preferably four in number. It should be noted that the grouping of write and read cycles, as shown in FIG. 6, is arranged to minimize switching of the bidirect data arrangement comprising the combination of the output driver 128 and the input buffer 136 (FIG. 5), thereby minimizing noise.

The caches 138 serve to sustain a constant flow of data through the read formatters 142 between cache updates. Essentially, the caches 138 perform a function on the memory read path which is analogous to the function performed by the sync buffers 103 on the memory write path.

Read formatters 142, preferably four in number, are controlled by the enable signal 112 from the sequencer 106 and receive a read format signal on control connection 95 from the CDN 43, which ultimately originates at the path allocation system 50. The read formatters 142 are associated respectively with the caches 138. The read formatters 142 read the data from the caches 138 and transfer the data to the data buses (main3, main2, main1, main0, intermix) of the switch module 36. Each of the individual read formatters 142 is connected to a respective main bus. Moreover, one, two, or four of the read formatters 142 concurrently provide an 8-bit word to its respective data bus during each clock cycle (26.6 MHz), depending upon the read format signal from the path allocation system 50. Essentially, the rate, or bandwidth, at which data is communicated along the data buses can be manipulated by manipulating the number of data buses which are utilized. The rate is adjusted so that it corresponds to a bit rate of a destination port which is to receive the data from the data buses.

Each 8-bit word which is passed to the data buses by the read formatters 142 on data connection 89 is accompanied by a two-bit tag via tag connection 89', which is similar to the two-bit tag on tag connection 81'. Specifically, a tag "00" indicates that the particular data bus is not being presently used. A tag "01" indicates that the particular data bus is currently in use and has data. A tag "10" indicates either SOF or EOF for a class 1 transfer. A tag "11" indicates either SOF or EOF for a class 2 transfer.

The two-bit tag on tag connection 89' is generated by a tag generator 148, which receives a send signal on control connection 97 from the status/control logic 85 (FIG. 3) of the corresponding port intelligence mechanism 73. The send signal indicates, among other things, the length of the data frame, so that the foregoing tag bits can be generated.

Figure 7:
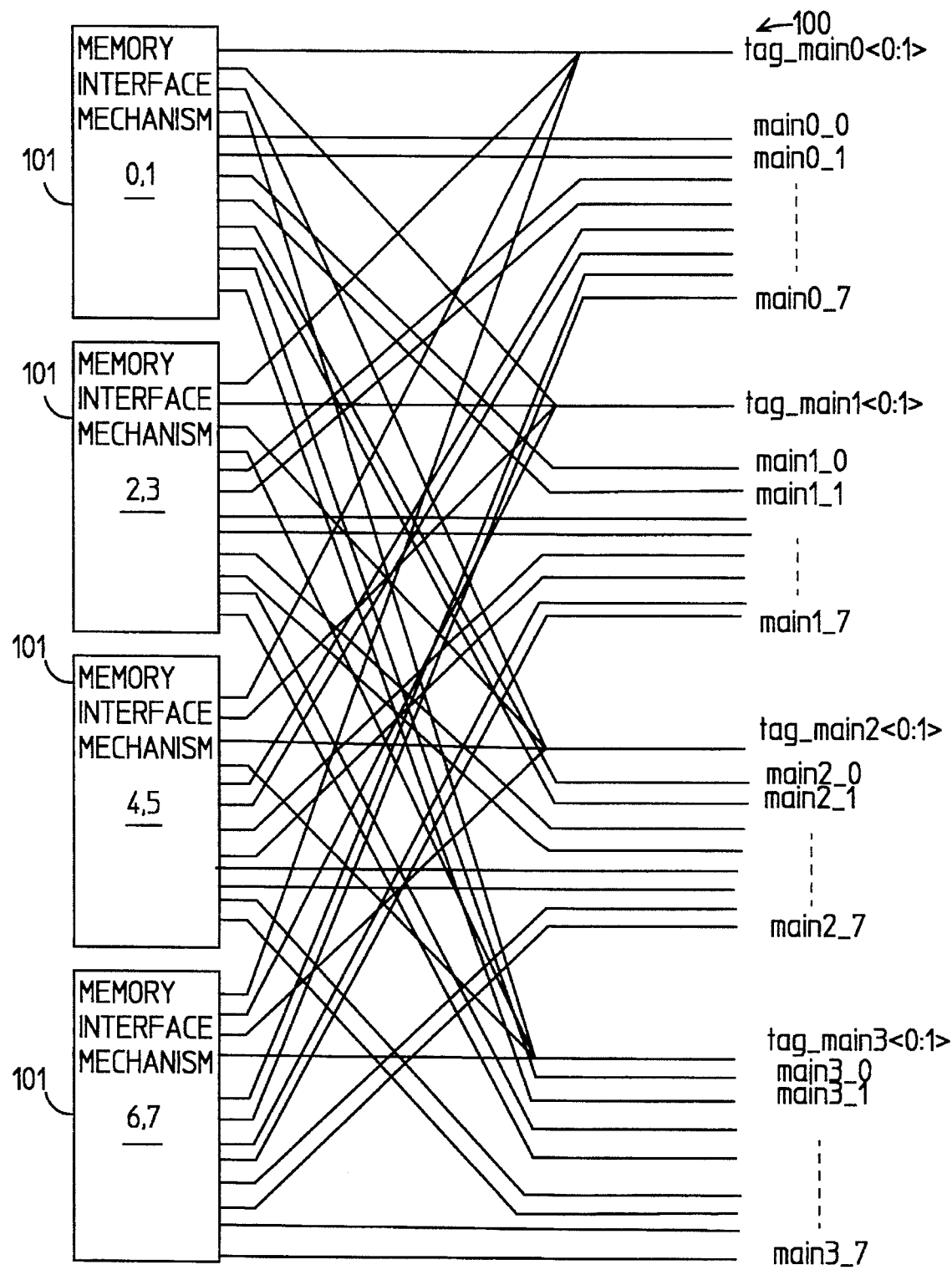
FIG. 7 is a schematic circuit diagram of a bit slicing interface between the memory interface system of FIG. 4 and the switch module of FIG. 2.

FIG. 7 is a schematic circuit diagram of a bit slicing interface 100 between the memory interface system 72 (FIG. 4) and the switch module 36 (FIG. 2). As illustrated in FIG. 7, four 10-bit main buses (main3, main2, main1, main0) are implemented in the preferred embodiment by the MDN 42 to receive source data from the memory interface system 72 and to transmit destination data to the memory interface system 72. The interface 100 further includes a 10-bit intermix bus associated with the IDN 44, which is not shown in FIG. 7 for simplicity, but is configured to receive and transmit bit sliced data similar to each of the main buses.

When source data is transferred from the system 72 to the switch module 36, source data bit sets are recombined to form the source data, and then the source data is transferred along the data buses of the MDN 42 or the IDN 44.

Notwithstanding differences in the rates of the ports 33, data flow along each of the data buses (main and intermix) occurs at 266 Mbit/s via implementation of the 26.6 MHz clock. Moreover, rate matching between ports 33 is facilitated by the number of data buses utilized at any given time. For example, consider when a 266 Mbit/s source port 33 communicates to a 1062 Mbit/s destination port 33. In this scenario, four of the read formatters 142 concurrently pass data to four of the data buses, and the four data buses concurrently forward data at 266 Mbit/s to the 1062 Mbit/s destination port 33 in order to accommodate the rate of 1062 Mbit/s. Furthermore, as another example, consider when a 1062 Mbit/s source port 33 forwards data to a 512 Mbit/s destination port 33. In this scenario, two of read formatters 142 concurrently forward data to two of the data buses, and the two data buses concurrently forward data at 266 Mbit/s to the 512 Mbit/s destination port 33 in order to accommodate the rate of 512 Mbit/s.

When destination data is transferred from the switch module 36 to the memory interface system 72, the destination data is again bit sliced and decomposed by the interface 100 of FIG. 7. Each memory interface mechanism 101 within the memory interface system 72 receives its respective bit set. Relative to receiving destination data and unlike the transfer of source data to the switch module 36, each memory interface mechanism 101 receives and monitors all of the two-bit tags from all of the data buses (main and intermix). These two-bit tags are the same tags sent out by the mechanisms 101. Each mechanism 101 should receive all tags so that they all operate concurrently in reading data from the data buses.

Referring back to FIG. 5, bit sliced destination data bits, which are output from the switch module 36 on data connection 94 to the memory interface system 72, are passed through buffers 161, 163 (or drivers) and are recombined with bit sliced destination data bits from the other memory interface mechanisms 101, as indicated by the destination reconstruction block 165, so that the destination data is reconstructed from the various bit sliced sets. In other words, the destination data is fully reconstructed at connection 167 from the destination data bit sets at connections 167a through 167b.

The destination data on connection 167 is channeled to the transmit memory component 144, which is preferably implemented as a 16k×9 first-in-first-out (FIFO) buffer, via connection 169 and is also sent to the bypass MUX 69 via bypass connection 99. Transmit control logic 145 controls the transmit memory component 144 through control connection 155 and controls the MUX 69 through bypass control connection 68. Moreover, the transmit memory component 144 is capable of informing the transmit control logic 145 when it is empty via empty control connection 157.

The transmit control logic 145 receives and monitors two-bit tags 94' from the data buses (main3, main2, main1, main0, intermix) in order to determine when bit sliced destination data bits are to be received and in order to determine the class. The coding of the two-bit tag 94' is the same as that for the two-bit tags 81', 89', as described previously. In the preferred embodiment, the two-bit tags 94' from all of the data buses (main and intermix) are initially received by a buffer (or driver) 171 within the memory interface system 101 and are then made available to the transmit control logic 145 via connection 94'.

Except for a class 1 data transfer that utilizes the intermix bus, when the transmit control logic 145 determines that a class 1 data transfer is to occur, then the transmit control logic 145 actuates the bypass MUX 69 via bypass control connection 68 so that the class 1 destination data is transferred directly from connection 94 (from the MDN 42 or IDN 44) to the connection 82 via the bypass connection 99. Ultimately, the class 1 data is forwarded to a transmitter 76 of an appropriate port intelligence mechanism 73.

In the case when an intermix frame is to be passed through the system 101 while a class 1 data transfer is already underway along bypass connection 99, the intermix bus of the IDN 44 passes the intermix frame to the transmit memory component 144 along connections 94, 153, concurrently while the class 1 data transfer occurs via the bypass connection 99. After the intermix frame has been completely written into the transmit memory component 144 and when the transmit control logic 145 detects a tag "00" pertaining to the class 1 data transfer to indicate that there is a break in the class 1 data transfer, then the transmit control logic 145 switches the MUX 69 via control connection 68 and causes the transmit memory component 144 to commence writing the intermix frame onto data connection 102 via control connection 155 so that the intermix frame is forwarded to the appropriate port intelligence mechanism 73 along data connection 82.

As the intermix frame is written from the transmit memory component 144, if the class 1 data transfer recommences, then the class 1 data transfer is channeled through the transmit memory component 144 behind the intermix frame so that a continuous data flow is maintained from the memory interface system 72 to the port intelligence system 71. If the class 1 data transfer does not recommence while the intermix frame is output, then the transmit memory component 144 will send an empty signal 157 to the transmit control logic 145 after the intermix frame has been entirely output. In turn, the transmit control logic 145 will switch the MUX 69 so that when the class 1 data transfer does recommence, it will be channelled along the bypass connection 99.

When the transmit control logic 145 determines, based upon the tags 94', that a class 2 data transfer is to occur, then the transmit control logic 145 controls the transmit memory component 144 to read data along connection 153 and to write data on connection 102 and actuates the MUX 69 via bypass control connection 68 so that data connection 102 communicates to the connection 82. In other words, the class 2 data is read from the transmit memory component 144 by the transmitter 76 (FIG. 3) of an appropriate port intelligence mechanism 73 (FIG. 3) and forwarded to the corresponding port 33.

Based upon the forgoing discussion of the memory interface system 72, it is apparent that the receive memory 84 (FIG. 3) is implemented in four 16K×16 SRAM integrated circuits, one of which is positioned in each of the memory interface mechanisms 101 of system 72. Whether operating at 266, 531, or 1062 Mbit/s, accesses to the receive memory 84 are coordinated such that reads and writes happen in lock-step among the memory interface mechanisms 101. Receive memory 84 may be regarded as a single SRAM with a 64-bit data path, shared by four 266 Mbit/s ports 33.

Figure 8:
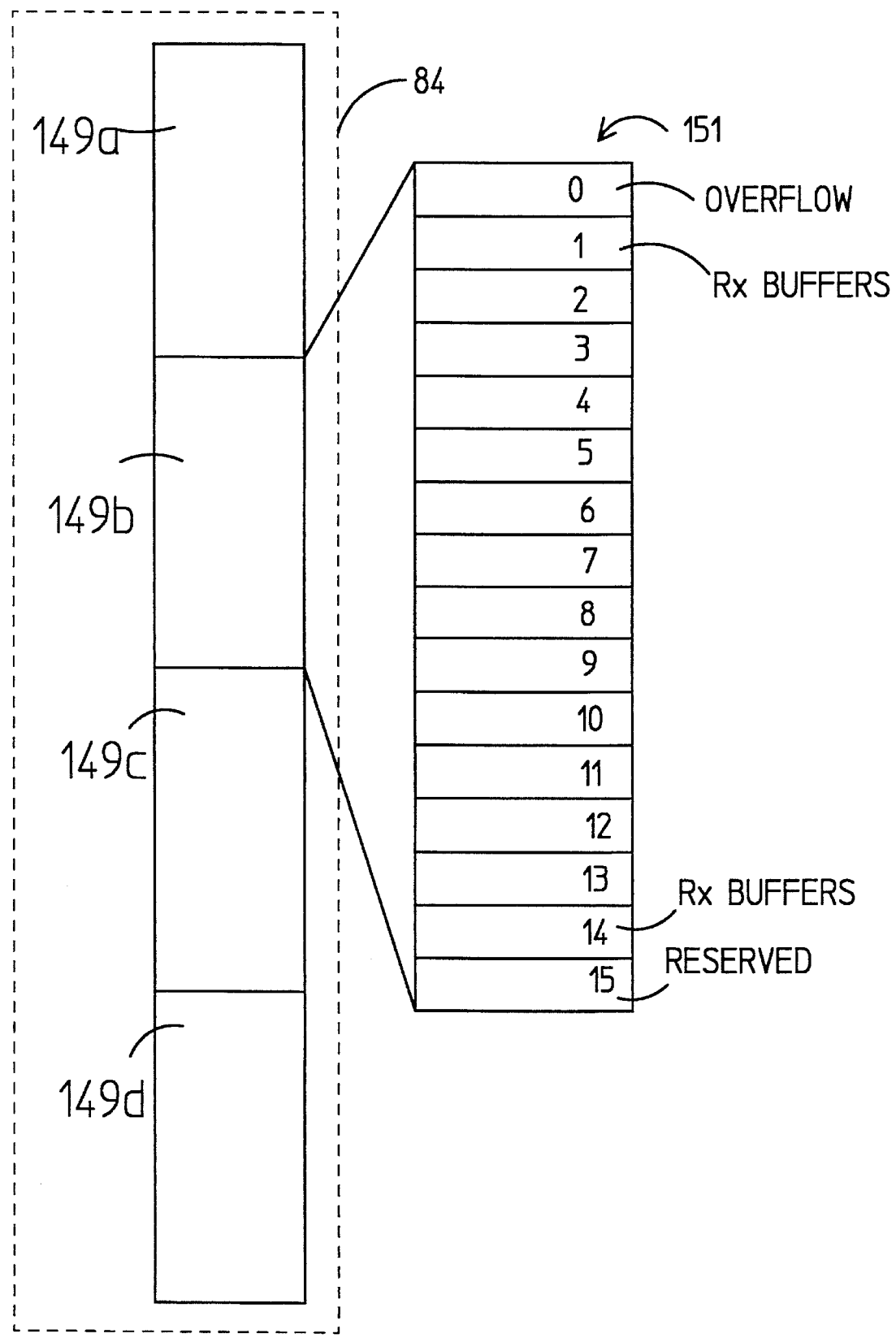
FIG. 8 is a schematic diagram of a buffer architecture for the memory interface system of FIG. 4.

In the preferred embodiment, the receive memory 84 is partitioned as shown in FIG. 8. The receive memory 84 is partitioned into four memory regions 149a–149d. In the case where a port intelligence system 71a (single 1062 Mbit/s port) is utilized, only the memory region 149a is used for storage. In the case when a port intelligence system 71b (two 531 Mbit/s ports) is utilized, the two memory regions 149a, 149b are used for storage. Finally, in the case when a port intelligence system 71c (four 266 Mbit/s ports) is utilized, all of the memory regions 149a–149d are used for storage.

Further, each of the memory regions 149a–149d has 16 memory blocks 151, each having a storage capacity of two kbytes. Fourteen of the sixteen memory blocks 151 are designated for frame transfers of class 2, one of the buffers is reserved for frames destined for the embedded N-port on the element controller 58 (FIG. 2), and one is reserved for buffer overflow. A maximum size frame in accordance with the Fibre Channel industry standard would occupy one entire 2K buffer plus 108 bytes of overflow. Furthermore, the binary addressing scheme utilized for the buffers is as follows: PPbbbbxxxxxxxx for the first seventeen memory blocks and PP1111bbbbxxxx for the overflow memory block, where PP identifies the port 33 and bbbb identifies the buffer.

Figure 9:
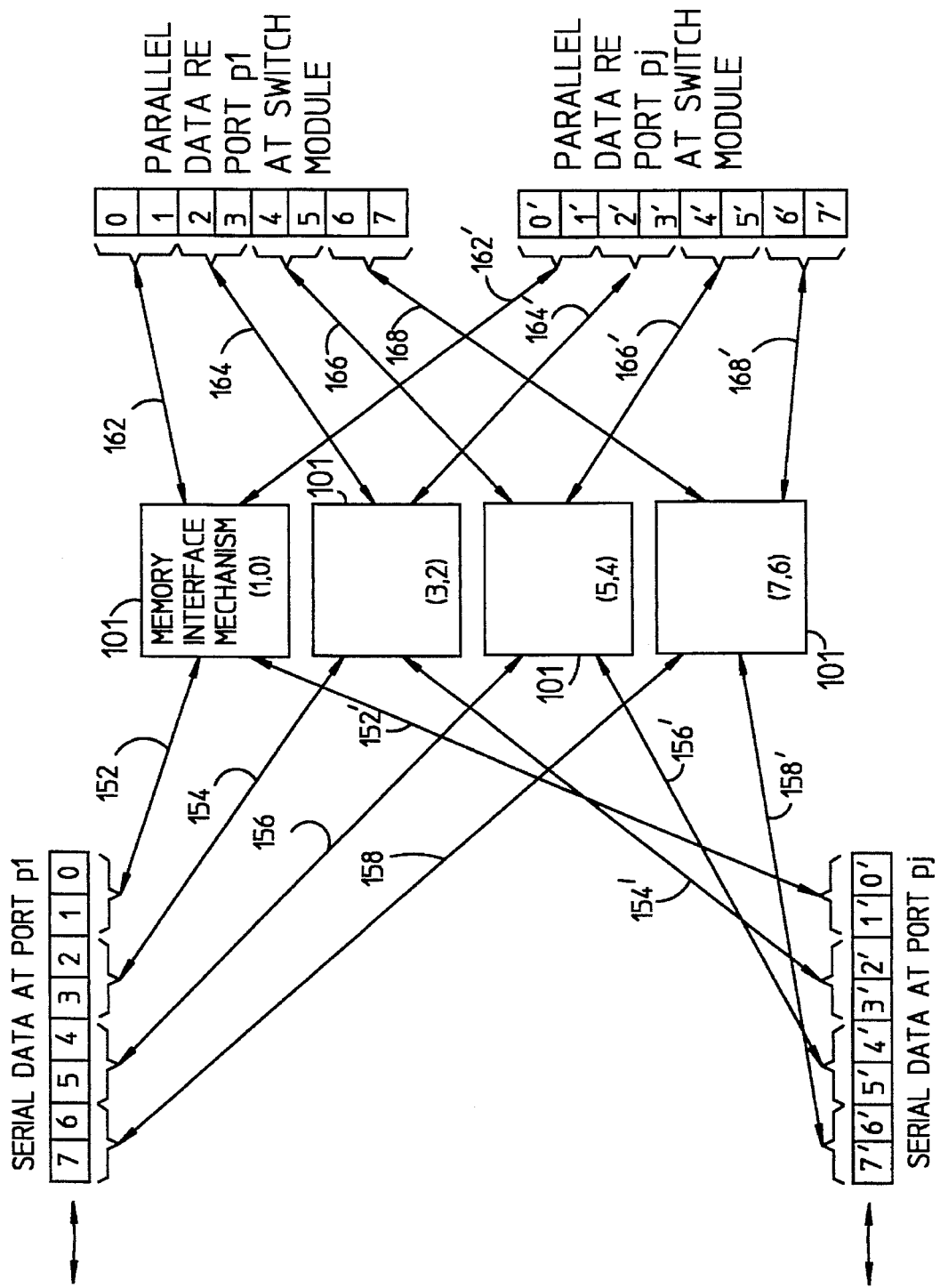
FIG. 9 is a schematic diagram showing the flow of data bits through the channel module of FIGS. 2 and 3 in accordance with a novel bit slicing architecture.

FIG. 9 illustrates the bidirectional flow of data bits (source and destination) through the plurality of memory interface mechanisms 101 of each channel module 34. Two ports p1, pj are shown as an example. In the scenario when source data is received, the source data from the respective port (p1 or pj) is transferred to and distributed among the four memory interface mechanisms 101, as indicated by reference arrows 152–158 (p1) and 152'–158' (pj). A first two bits (1, 0) of each serial source data stream are forwarded to a first memory interface mechanism 101, which is designated for storing these particular bits. The next two bits (3, 2) of each serial source data stream are forwarded to a second memory interface mechanism 101, which is dedicated to storing these particular bits. The next two bits (5, 4) of each serial source data stream are forwarded to a third memory interface mechanism 101, which is dedicated to storing these particular bits. Finally, the next two bits (7, 6) of each serial source data stream are forwarded to a fourth memory interface mechanism 101, which is dedicated to storing these particular bits. When the source data is read from the memory interface mechanisms 101, it is read from the memory interface mechanisms 101 collectively so that each of the memory interface mechanisms 101 contributes its respective bits, as indicated by reference arrows 162–168 (p1) and 162'–168' (pj), so as to reconstruct the source data for passage into the switch module 36.

Conversely, in the scenario when destination data is received by the channel module 34, the destination data for the respective destination port (p1 or pj) is transferred to and distributed among the four memory interface mechanisms 101, as indicated by reference arrows 162–168 (p1) and 162'–168' (pj). Moreover, when the destination data is read from the memory interface mechanisms 101, it is read from the memory interface mechanisms 101 collectively so that each of the memory interface mechanisms 101 contributes its respective bits, as indicated by reference arrows 152–158 (p1) and 152'–158' (pj), so as to reconstruct the destination data for passage into the appropriate fiber optic channel 32.

In conclusion, the bit slicing architecture of the receive memory 84 in the memory interface system 72 provides a solution to the difficulties associated with rate matching. It does so by storing frames in receive memory 84 in exactly the same distributed format regardless of port speed. This makes the rate at which frames are forwarded through the switch module 36 a completely separate and unrelated issue.

Moreover, regardless of whether there are four 266 Mbit/s ports 33, two 531 Mbit/s ports 33, or one 1062 Mbit/s port 33, the byte wide flows of received data to the memory interface system 72, appear the same. Programmable length pipelines in the memory interface system 72 adapt on the arrival of each frame to ensure this uniform format.

It will be obvious to those skilled in the art that many variations and modifications may be made to the preferred embodiments set forth previously without substantially departing from the principles of the present invention. All such variations and modifications are intended to be included herein within the scope of the present invention, as set forth in the following claims.

Wherefore, the following is claimed:

1. A memory interface system for providing a memory to accommodate frame switching in a fiber optic switch, while simplifying the memory input/output interface and minimizing hardware, comprising:

port intelligence means for receiving source data to be routed through said switch from a port to be connected to a fiber optic channel;

slicing means for slicing first and second sets of bits from said source data;

first and second receive memory components for receiving said first and second sets, respectively, from said slicing means; and memory output means for receiving said first and second sets from said first and second receive memory components, respectively, and for recombining said first and second sets to reconstruct said source data, a receiver associated with said port intelligence means, said receiver for receiving a header associated with said source data and for generating a tag indicative of when said source data is to be transferred through said memory interface system via frame switching and via circuit switching;

first and second receive bypass paths configured to receive said first and second sets of bits;

first and second multiplexers configured to receive said first and second sets of bits from said first and second memory components and from said first and second receive bypass paths and configured to provide said first and second sets to said memory output means;

first and second receive tag control means associated with said first and second multiplexers, said first and second receive tag control means for receiving said tag and for generating first and second bypass control signals for said first and second multiplexers; and whereby when said source data corresponds to said circuit switching; said multiplexers are controlled by said receive tag control means to bypass said receive memory, components so that said sets are communicated to said memory output means without memory, storage and when said source data corresponds to frame switching, said sets are communicated from said memory components to said memory output means.

2. The system of claim 1, wherein said source data is a frame having a start-of-frame indicator and an end-of-frame indicator and further comprising a control means associated with said port intelligence means, said control means for determining a length associated with said frame based upon said indicators and for forwarding said length to said memory output means when said memory output means reads from said memory components.

3. The system of claim 1, further comprising first and second accumulation means associated with said first and second receive memory components, said first and second accumulation means for accumulating a plurality of said first and second sets of bits at a rate defined by said port and for commmunicating said first and second sets to said first and second receive memory components at a predetermined rate.

4. The system of claim 3, further comprising:

first and second synchronization buffer means for receiving said first and second sets of bits from said port intelligence means;

first and second write formatter means connected to said first and second accumulation means via a plurality of data buses, said first and second write formatter means for receiving a format signal indicative of a source bit rate corresponding with said source data, said first and second write formatter means for communicating said first and second sets of bits from said first and second synchronization buffer means to said first and second accumulation means at said source bit rate by using a particular number of said data buses corresponding to said source bit rate; and wherein said first and second accumulation means receive said format signal, accumulate said first and second sets of bits at said source bit rate, and output said first and second sets at said predetermined bit rate.

5. The system of claim 3, further comprising:

a plurality of data buses in communication with other ports;

first and second cache means for receiving said first and second sets of bits from said first and second receive memory components; and first and second read formatter means for receiving a format signal indicative of a bit rate for output of said sets of bits, said first and second read formatter means for communicating said sets of bits from said first and second receive memory components to said data buses at said bit rate by using a particular number of said data buses corresponding to said bit rate.

6. A memory interface system for providing a memory to accommodate frame switching in a fiber optic switch, while simplifying the memory input/output interface and minimizing hardware, comprising:

port intelligence means for receiving source data to be routed through said switch from a port to be connected to a fiber optic channel:

slicing means for slicing first and second sets of bits from said source data;

first and second receive memory components for receiving said first and second sets, respectively, from said slicing means; and memory output means for receiving said first and second sets from said first and second receive memory components, respectively, and for recombining said first and second sets to reconstruct said source data, a transmit memory configured to receive destination data directed to said port, said destination data having a tag indicative of when said destination data is to be transferred through said memory interface system via frame switching and via circuit switching;

a transmit bypass path configured to receive said destination data;

a multiplexer configured to receive said destination data from said transmit memory and from said transmit bypass path;

a transmitter for communicating said destination data from said multiplexer to said port;

control means associated with said multiplexer, said control means for receiving said tag and for generating a bypass control signal for said multiplexer; and whereby when said destination data corresponds to said circuit switching, said multiplexer is controlled by said control means to bypass said transmit memory so that said destination data is communicated through said memory interface system without memory storage and when said destination data corresponds to said frame switching, said destination data passes through said transmit memory.

7. A memory interface system for providing a memory to accommodate frame switching in a fiber optic switch, while simplifying the memory input/output interface and minimizing hardware, comprising:

(a) at least one port intelligence means for receiving source data from a port;

(b) source data slicing means for slicing first and second sets of source bits from said source data;

(c) first and second memory interface means for receiving said first and second sets respectively and for providing access to temporary memory storage, each said memory interface means comprising:

(1) a receive memory component configured to receive said corresponding set of source bits; and (2) memory output means for receiving said corresponding set of source bits from said receive memory component; and (d) source data reconstruction means connected to said memory output means associated with each said first and second memory interface means, said source data reconstruction means for recombining said first and second sets to reconstruct said source data, wherein said port intelligence means further comprises control means for receiving a header associated with said source data and for generating a tag indicative of when said source data is to be transferred through said switch via frame switching and via circuit switching; and wherein each said first and second memory interface means further comprises:

a receive bypass path configured to receive said corresponding set of source bits;

a multiplexer configured to receive said corresponding set of source bits from said receive bypass path;

receive tag control means associated with said multiplexer, said receive tag control means for receiving said tag and for generating a bypass control signal for controlling said multiplexer; and whereby when said source data corresponds to said circuit switching, said multiplexer is controlled by said receive tag control means to bypass said corresponding receive memory component so that said corresponding set is communicated through said corresponding memory interface system without memory storage, and when said source data corresponds to said frame switching, said multiplexer is controlled by said receive tag control means so that said corresponding set is communicated through said receive memory component.

8. The system of claim 7, wherein said source data is a frame having a start-of-frame indicator and an end-of-frame indicator and wherein said port intelligence means comprises a control means for determining a length associated with said frame based upon said indicators and for forwarding said length to said corresponding memory output means when said corresponding memory output means reads from said corresponding memory component.

9. The system of claim 7, wherein each said first and second memory interface means further comprises an accumulation means associated with said corresponding receive memory component, said accumulation means for accumulating a plurality of said corresponding sets of source bits at a rate defined by said source port and for communicating said corresponding sets to said corresponding receive memory component at a predetermined rate.

10. The system of claim 7, wherein said at least one port intelligence means receives said source data at a first bit rate and wherein said port intelligence means resides within an interchangeable unit which is configured to be replaced by another unit having another port intelligence means for receiving said source data at another bit rate which is different from said first bit rate.

11. The system of claim 9, wherein each said first and second memory interface means further comprises:

a synchronization buffer means for receiving said corresponding sets of source bits from said port intelligence means;

a write formatter means connected to said corresponding accumulation means via a plurality of data buses, said write formatter means for receiving a format signal indicative of source bit rate corresponding with said source data, said write formatter means for communicating said corresponding set of source bits from said synchronization buffer means to said accumulation means at said source bit rate by using a particular number of said data buses corresponding to said source bit rate; and wherein said corresponding accumulation means receives said format signal, accumulates said corresponding sets of source bits at said source bit rate, and outputs said corresponding sets at said predetermined bit rate.

12. The system of claim 9, further comprising a plurality of data buses interconnecting said first and second memory interface means with a destination port; and wherein each said first and second memory interface means further comprises:

a cache means for receiving corresponding sets of source bits from said corresponding receive memory component; and a read formatter means for receiving a format signal indicative of a destination bit rate for output of said corresponding sets of source bits, said read formatter means for communicating said corresponding sets of source bits from said corresponding receive memory component to said data buses at said destination bit rate by using a particular number of said data buses which effectuates said destination bit rate.

13. A memory interface system for providing a memory to accommodate frame switching in a fiber optic switch, while simplifying the memory input/output interface and minimizing hardware, comprising:

(a) at least one port intelligence means for receiving source data from a port;

(b) source data slicing means for slicing first and second sets of source bits from said source data;

(c) first and second memory interface means for receiving said first and second sets respectively and for providing access to temporary memory storage, each said memory interface means comprising:
  (1) a receive memory component configured to receive said corresponding set of source bits; and
  (2) memory output means for receiving said corresponding set of source bits from said receive memory component; and
(d) source data reconstruction means connected to said memory output means associated with each said first and second memory interface means, said source data reconstruction means for recombining said first and second sets to reconstruct said source data;
(e) destination data slicing means for receiving destination data intended for a destination port associated with said at least one port intelligence means, said destination data slicing means for slicing first and second sets of destination bits from said destination data and for channeling said first and second sets respectively to said first and second memory interface means respectively;
(f) wherein each said first and second memory interface means further comprises:
  (1) a destination data reconstruction means for receiving said corresponding set of destination bits from said destination data slicing means and for receiving the other set of destination bits from the other memory interface means, said destination data reconstruction means for recombining said first and second sets of destination bits to reconstruct said destination data;
  (2) a transmit bypass path configured to receive said destination data from said destination data reconstruction means;
  (3) a multiplexer configured to receive said destination data from said transmit bypass path;
  (4) a transmit memory means for receiving said destination data from said destination data reconstruction means; and
  (5) transmit control means for receiving a tag from said destination data and for generating a bypass control signal indicative of when said destination data is to be transferred through said switch via frame switching and via circuit switching, said transmit control means for controlling said multiplexer.

* * * * *